(12) United States Patent
Lee et al.

(10) Patent No.: US 11,738,672 B2
(45) Date of Patent: Aug. 29, 2023

(54) VEHICLE SEAT POWER CONSUMPTION CONTROL DEVICE AND METHOD

(71) Applicants: HYUNDAI MOTOR COMPANY, Seoul (KR); KIA CORPORATION, Seoul (KR)

(72) Inventors: Dong Hoon Lee, Seoul (KR); Doo Ri Kim, Goyang-si (KR); Yo Han Kim, Ansan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 218 days.

(21) Appl. No.: 17/228,858

(22) Filed: Apr. 13, 2021

(65) Prior Publication Data

US 2022/0055508 A1 Feb. 24, 2022

(30) Foreign Application Priority Data

Aug. 20, 2020 (KR) ........................ 10-2020-0104816

(51) Int. Cl.
*B60N 2/56* (2006.01)
(52) U.S. Cl.
CPC ................... *B60N 2/5678* (2013.01)

(58) Field of Classification Search
CPC .............. B60H 1/00478; B60H 1/2218; B60H 1/00428; B60H 2001/225; B60H 2001/2265; B60N 2/56; B60N 2/5678
See application file for complete search history.

(56) References Cited

U.S. PATENT DOCUMENTS

| | | | |
|---|---|---|---|
| 5,450,894 A * | 9/1995 | Inoue | B60H 1/00842 454/907 |
| 9,434,236 B2 * | 9/2016 | Guillory | B60H 1/00378 |
| 11,021,085 B2 * | 6/2021 | Fujii | A47C 7/62 |
| 2022/0072962 A1 * | 3/2022 | Maury | B60L 58/12 |

* cited by examiner

*Primary Examiner* — Sarah B McPartlin
(74) *Attorney, Agent, or Firm* — Morgan, Lewis & Bockius LLP

(57) ABSTRACT

A vehicle seat power consumption control device and method therefor, may reduce a voltage supplied to a heating wire or air blower provided in a vehicle seat based on at least one of a position of the vehicle seat, body information related to an occupant, and power consumption time (operation time of a heating wire or an air blower) of the vehicle seat to reduce power consumption of a battery while maintaining a sensory temperature of an occupant at a certain level, improving fuel efficiency of the vehicle. To this end, the vehicle seat power consumption control device may include a sensor that obtains an angle of a vehicle seat and a controller that adjusts a voltage supplied to an electric device provided in the vehicle seat according to the angle of the vehicle seat.

18 Claims, 7 Drawing Sheets

VEHICLE SEAT POWER CONSUMPTION CONTROL DEVICE AND METHOD

CROSS-REFERENCE TO RELATED APPLICATION

The present application claims priority to Korean Patent Application No. 10-2020-0104816, filed on Aug. 20, 2020, the entire contents of which is incorporated herein for all purposes by this reference.

BACKGROUND OF THE INVENTION

Field of the Invention

The present invention relates to a technology for reducing power consumption in a heating wire and an air blower provided in a vehicle seat without a change in a sensory temperature.

Description of Related Art

Most recently-released vehicles are provided with a heating wire that raises a driver's body temperature on a seat and an air blower that lowers the driver's body temperature to raise the driver's body temperature in a cold day and lower the driver's body temperature in a hot day, providing an optimal driving environment.

The heating wire and air blower mounted in the vehicle seat have the highest power consumption of a battery among the electric loads in the vehicle and thus, it is necessary to efficiently control the power consumption in the vehicle seat in preparation for a further increase in power consumption in the vehicle in the future.

However, the control of the power consumption in the vehicle seat while not maintaining a desired sensory temperature may lower the driver's satisfaction with a heated or cooled seat provided in the vehicle, which may lower the driver's satisfaction with the vehicle itself, causing even bigger problems.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle seat power consumption control device and method therefor, which reduce a voltage supplied to a heating wire or air blower provided in a vehicle seat based on a position of the vehicle seat to reduce power consumption of a battery while maintaining a sensory temperature of an occupant at a certain level, improving fuel efficiency of the vehicle.

Various aspects of the present invention provide a vehicle seat power consumption control device and method therefor, which reduce a voltage supplied to a heating wire or air blower provided in a vehicle seat based on body information related to an occupant and power consumption time (operation time of a heating wire or an air blower) of the vehicle seat to reduce power consumption of a battery while maintaining a sensory temperature of an occupant at a certain level, improving fuel efficiency of the vehicle.

Various aspects of the present invention provide a vehicle seat power consumption control device and method therefor, which reduce a voltage supplied to a heating wire or air blower provided in a vehicle seat based on a position of the vehicle seat, body information related to an occupant, and power consumption time (operation time of a heating wire or an air blower) of the vehicle seat to reduce power consumption of a battery while maintaining a sensory temperature of an occupant at a certain level, improving fuel efficiency of the vehicle.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, a vehicle seat power consumption control device may include a sensor that obtains an angle of a vehicle seat, and a controller that adjusts a voltage supplied to an electric device provided in the vehicle seat according to the angle of the vehicle seat.

The controller may be configured to determine a voltage reduction rate using a correction constant according to the angle of the vehicle seat and a thickness of the vehicle seat, and a correction constant according to a material of the vehicle seat.

The controller may adjust the voltage supplied to the electric device according to the determined voltage reduction rate.

The angle of the vehicle seat may be one of a back angle of the vehicle seat, a cushion angle of the vehicle seat, and an average value of the back angle of the vehicle seat and the cushion angle of the vehicle seat.

According to various aspects of the present invention, a vehicle seat power consumption control method may include obtaining, by a sensor, an angle of a vehicle seat, and adjusting, by a controller connected to the sensor, a voltage supplied to an electric device provided in the vehicle seat according to the angle of the vehicle seat.

The adjusting of the voltage supplied to the electric device may include determining a voltage reduction rate using a correction constant according to the angle of the vehicle seat and a thickness of the vehicle seat, and a correction constant according to a material of the vehicle seat, and adjusting the voltage supplied to the electric device according to the determined voltage reduction rate.

According to various aspects of the present invention, a vehicle seat power consumption control device may include a storage that stores a table in which body information related to an occupant of a vehicle seat and a voltage reduction rate corresponding thereto are recoded, and a controller that adjust a voltage supplied to an electric device according to the voltage reduction rate.

The controller may adjust a number of times the voltage reduction rate is applied to the voltage supplied to the electric device in consideration of an operation time of the electric device.

The vehicle seat power consumption control device may further include a sensor that obtains an angle of the vehicle seat and the controller may primarily apply the voltage reduction rate obtained according to the table to the voltage supplied to the electric device, and secondarily apply a voltage reduction rate determined according to the angle of the vehicle seat to a result of the primarily applying.

The controller may be configured to determine a voltage reduction rate using a correction constant according to the angle of the vehicle seat and a thickness of the vehicle seat, and a correction constant according to a material of the vehicle seat.

The angle of the vehicle seat may be one of a back angle of the vehicle seat, a cushion angle of the vehicle seat, and an average value of the back angle of the vehicle seat and the cushion angle of the vehicle seat.

According to various aspects of the present invention, a vehicle seat power consumption control method may include storing, by a storage, a table in which body information related to an occupant of a vehicle seat and a voltage reduction rate corresponding thereto are recoded, and adjusting, by a controller connected to the storage, a voltage supplied to an electric device based on the voltage reduction rate.

The adjusting of the voltage supplied to the electric device may include adjusting, by the controller, a number of times the voltage reduction rate is applied to the voltage supplied to the electric device in consideration of an operation time of the electric device.

The adjusting of the voltage supplied to the electric device may include primarily applying the voltage reduction rate obtained according to the table to the voltage supplied to the electric device, and secondarily applying a voltage reduction rate determined according to an angle of the vehicle seat to a result of the primarily applying.

The secondarily applying of the voltage reduction rate may include determining a voltage reduction rate using a correction constant according to the angle of the vehicle seat and a thickness of the vehicle seat, and a correction constant according to a material of the vehicle seat.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
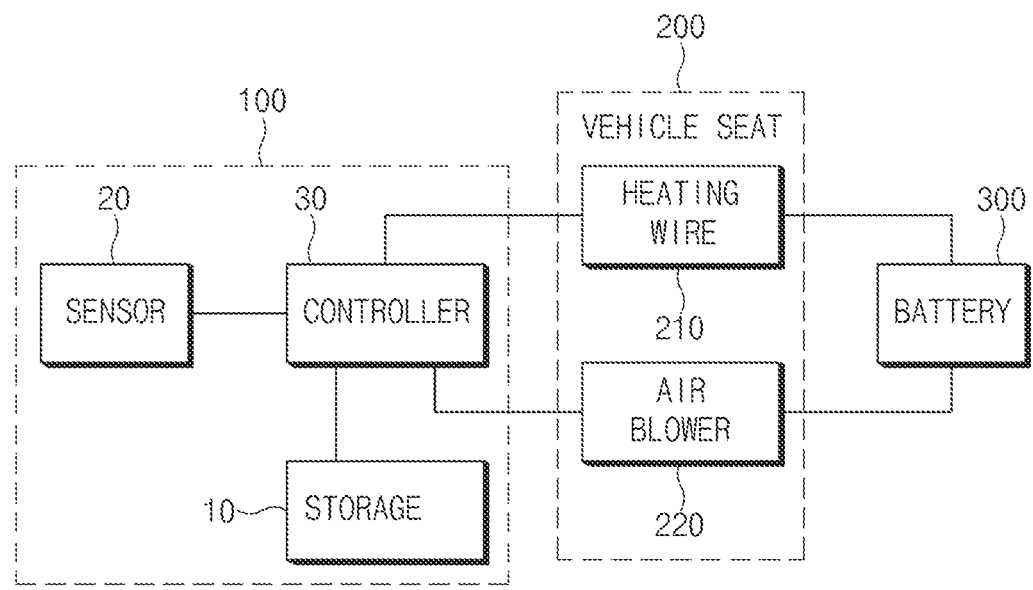
FIG. 1 is a schematic diagram of a vehicle seat power consumption control device according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a schematic diagram of a vehicle seat power consumption control device according to various exemplary embodiments of the present invention.

Referring to FIG. 1, an apparatus 100 for controlling power consumption in a vehicle seat according to various exemplary embodiments of the present invention may include storage 10, a sensor 20, and a controller 30. In the instant case, according to an apparatus 100 for controlling power consumption in a vehicle seat according to various exemplary embodiments of the present invention, components may be combined with each other as one entity, or some components may be omitted.

The components described above will be described. First, the storage 10 may store various logics, algorithms, and programs required during a process for adjusting a voltage supplied to a heating wire 210 or an air blower 220 provided in a vehicle seat 200 based on a position of the vehicle seat 200. In the instant case, the vehicle seat 200 may include the heating wire 210 or the air blower 220 as electric devices.

The storage 10 may store an algorithm used to determine a reduction rate (%) of a voltage supplied to the heating wire 210 or the air blower 220 based on the position of the vehicle seat 200. Here, the position of the vehicle seat 200 is a representative angle ($\theta$) of the seat, and may be an angle determined by an angle of a seat back ($\theta_1$), an angle of a seat cushion ($\theta_2$), or a combination of the angle of the seat back ($\theta_1$) and the angle of the seat cushion ($\theta_2$). In the instant case, the combination may include an average of the angle of the seat back ($\theta_1$) and the angle of the seat cushion ($\theta_2$), an average reflecting a weight according to the ratio of the angle of the seat back to the angle of the seat cushion, and the like.

The storage 10 may store various logics, algorithms, and programs required during a process for adjusting a voltage supplied to the heating wire 210 or the air blower 220 provided in the vehicle seat 200 based on the body information related to an occupant and a power consumption time of the vehicle seat 200.

The storage 10 may store a table used to determine a reduction rate (%) of a voltage supplied to the heating wire 210 or the air blower 220 based on the body information related to an occupant of the vehicle seat 200 and a power consumption time of the vehicle seat 200. Such a table is shown in Table 1 below as an example, and may be generated through deep learning.

TABLE 1

| Body information related to occupant | | | Data | |
| --- | --- | --- | --- | --- |
| Gender (M/F) | Height (cm) | Weight (kg) | CASE | Voltage Reduction Rate (%/min) |
| M | 177 | 80 | 1 | 5%/min |
| M | 176 | 64 | 2 | 3%/min |
| F | 156 | 44 | 1 | 5%/min |
| F | 162 | 46 | 3 | 2%/min |
| M | 182 | 80 | 2 | 3%/min |
| F | 180 | 60 | 4 | 7%/min |
| M | 179 | 75 | 2 | 3%/min |
| F | 150 | 45 | 1 | 5%/min |

In Table 1, a male with a height of 177 cm and a weight of 80 kg and a female with a height of 156 cm and a weight of 44 kg are determined as the same case and the same voltage reduction rate (5%/min) may be applied. Furthermore, a female with a height of 156 cm and a weight of 44 kg and a female with a height of 150 cm and a weight of 45 kg are determined as the same case and the same voltage reduction rate (5%/min) may be applied.

The storage 10 may store various logics, algorithms, and programs required during a process for adjusting a voltage supplied to the heating wire 210 or the air blower 220 provided in the vehicle seat 200 based on the position of the vehicle seat 200 and the body information related to the occupant of the vehicle seat 200 and the power consumption time of the vehicle seat 200.

The storage 10 may store an algorithm used to primarily adjust the voltage supplied to the heating wire 210 or the air blower 220 provided in the vehicle seat 200 based on Table 1, and also secondary adjust the voltage, which has primary adjusted, based on the position of the vehicle seat 200.

The storage 10 may store a height and a weight as body information related to an occupant (passenger).

The storage 10 may include at least one type of storage medium of a flash memory type, a hard disk type, a micro type, and a card type (e.g., a Secure Digital Card (SD card) or an eXtream Digital card (XD card)) of memory, a Random Access Memory (RAM), a Static RAM (SRAM), a Read-Only Memory (ROM), a Programmable ROM (PROM), an Electrically Erasable PROM (EEPROM), a Magnetic Memory (MRAM), a magnetic disk, and an optical disk type of memory.

The sensor 20 may obtain the position information related to the vehicle seat 200. In the instant case, the position information is an angle of the vehicle seat 200 and may include an angle of a seat back ($\theta_1$) and an angle of a seat cushion ($\theta_2$).

The sensor 20 may include a first motor position sensor that detects a position of a first motor that adjusts the angle of the seat back, and a second motor position sensor that detects a position of a second motor that adjusts the angle of the seat cushion.

The sensor 20 may include a temperature sensor that measures a temperature of the vehicle seat 200. In the instant case, the temperature sensor may be a temperature sensor based on a Negative Temperature Coefficient of Resistance (NTC) device.

The controller 30 may perform overall control such that each of the above components normally performs its function. The controller 30 may be implemented in a form of hardware or software, or may be implemented in a combination of hardware and software. The controller 30 may be implemented with a microprocessor, but is not limited thereto The controller 30 may perform a variety of control during a process for adjusting a voltage supplied to the heating wire 210 or the air blower 220 provided in the vehicle seat 200 based on a position of the vehicle seat 200.

The controller 30 may perform a variety of controls during a process for adjusting a voltage supplied to the electric device (e.g., the heating wire 210 or the air blower 220) provided in the vehicle seat 200 based on the body information related to the occupant and the power consumption time of the vehicle seat 200.

The controller 30 may perform a variety of controls during the process for adjusting a voltage supplied to the heating wire 210 or the air blower 220 provided in the vehicle seat 200 based on the position of the vehicle seat 200 and the body information related to the occupant of the vehicle seat 200 and the power consumption time of the vehicle seat 200.

The controller 30 may access a vehicle network and collect various types of information. In the instant case, vehicle networks may include a Controller Area Network (CAN), a Controller Area Network with Flexible Data-rate (CAN FD), a Local Interconnect Network (LIN), FlexRay, Media Oriented Systems Transport (MOST), and Ethernet, and the like.

Hereinafter, the operation of the controller 30 will be described with reference to FIG. 2, FIG. 3 and FIG. 4.

Figure 2:
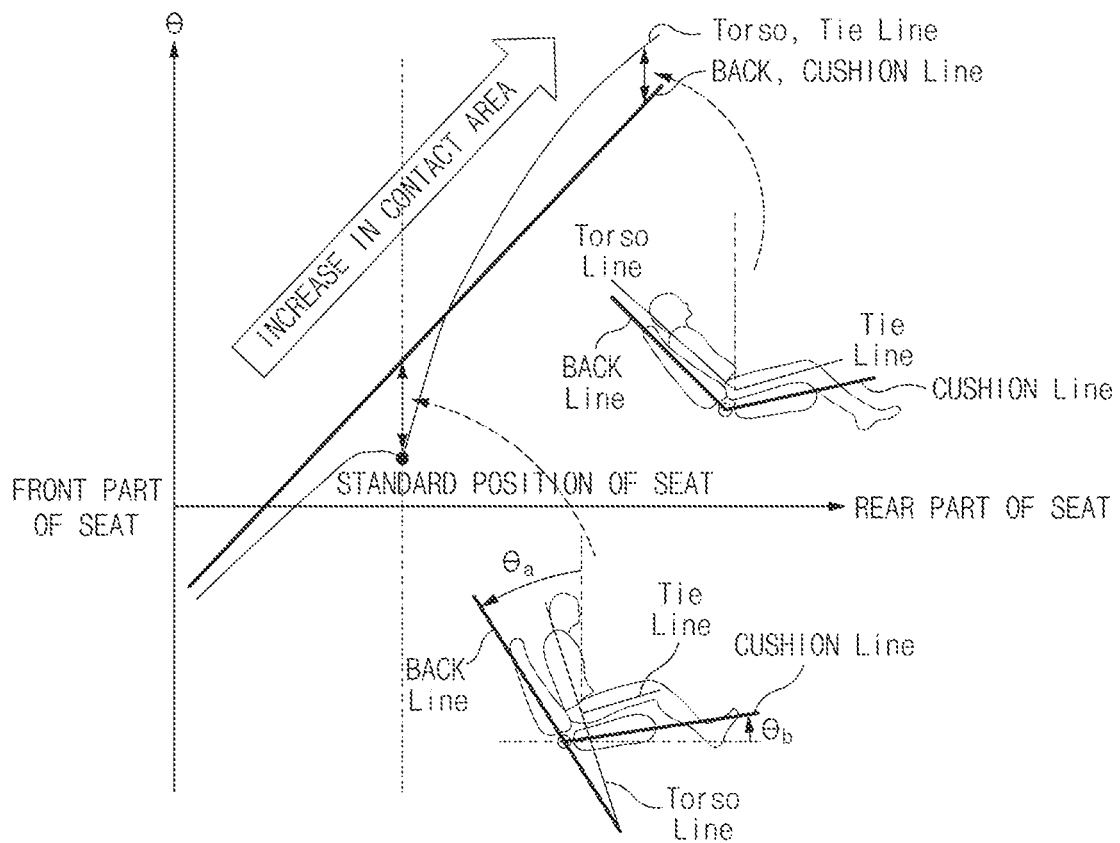
FIG. 2 is an exemplary view showing a principle in which a vehicle seat power consumption control device according to various exemplary embodiments of the present invention reduces power consumption in a battery while maintaining a sensory temperature of an occupant at a certain level.

FIG. 2 is an exemplary view showing a principle in which a vehicle seat power consumption control device according to various exemplary embodiments of the present invention reduces power consumption in a battery while maintaining a sensory temperature of an occupant at a certain level.

Referring to FIG. 2, it may be seen that the contact area between a seat and an occupant increases as the change amount ($\theta_b$) in an angle of the seat cushion increases and the change amount ($\theta_a$) in an angle of the seat back increases. Even when the voltage supplied to the heating wire 210 is reduced by a certain level, there is no significant difference in a sensory temperature of the occupant because the amount of heat transfer increases when the contact area increases. Similarly, even when the voltage supplied to the air blower 220 is reduced by a certain level, there is no significant difference in a sensory temperature of the occupant because the amount of air transfer increases when the contact area between the seat and the occupant increases. The controller 30 may adjust a voltage supplied to the heating wire 210 or the air blower 220 according to the position of the vehicle seat 200 using the present principle.

Figure 3:
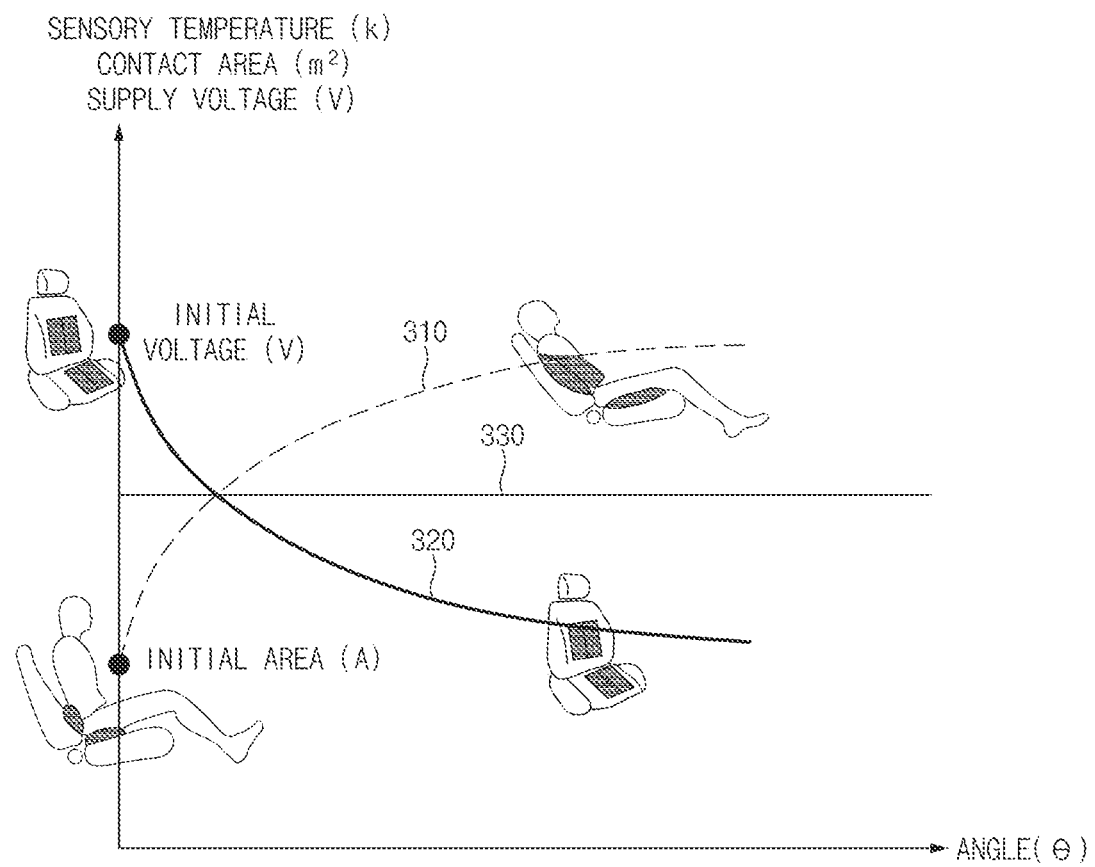
FIG. 3 is an exemplary view of a graph used by a vehicle seat power consumption control device according to various exemplary embodiments of the present invention to control power consumption in the vehicle seat.

FIG. 3 is an exemplary view of a graph used by a vehicle seat power consumption control device according to various exemplary embodiments of the present invention to control power consumption in the vehicle seat.

As shown in FIG. 3, a horizontal axis represents an angle $\theta$ of the vehicle seat 200, and a perpendicular axis represents the sensory temperature (K), the contact area (m$^2$) or the supply voltage (V). When the angle $\theta$ of the vehicle seat 200 increases, that is, when the seat back is laid backward, the contact angle between torso line and seat back is decreased from $\theta_a$ to $\theta_b$, as shown in FIG. 2 and thus the contact area between the vehicle seat 200 and the occupant increases (310). When the contact area increases as described above, the voltage supplied to the heating wire 210 or the air blower 220 is reduced (320), thus maintaining a sensory temperature felt by the occupant (330). In the instant case, a warm-up time is required at the initial stage of operation of the heating wire 210 or the air blower 220, so that the voltage supplied to the heating wire 210 or the air blower 220 is reduced after a certain time (e.g., 5 minutes) has elapsed, but is not necessarily limited thereto.

Figure 4:
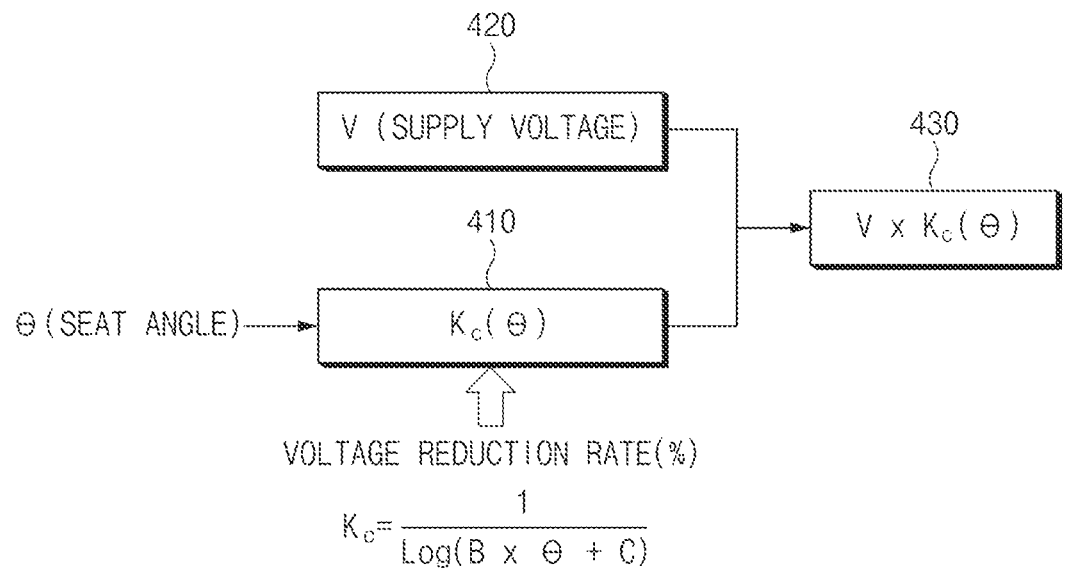
FIG. 4 is an exemplary view showing a process of adjusting a supply voltage based on a seat angle in a vehicle seat power consumption control device according to various exemplary embodiments of the present invention.

FIG. 4 is an exemplary view showing a process of adjusting a supply voltage based on a seat angle in a vehicle seat power consumption control device according to various exemplary embodiments of the present invention.

First, the controller 30 may determine a voltage reduction rate Kc corresponding to a seat angle $\theta$ based on the following [Equation 1] (410).

$$K_c = \frac{1}{\text{Log}(B \times \theta + C)} \quad \text{[Equation 1]}$$

Here, "B" denotes a correction constant according to a thickness of the seat, "$\theta$" denotes a seat angle, and "C" denotes a correction constant according to a material of the seat. Herein, a value when a voltage reduction rate for the heating wire 210 is determined and a value when a voltage reduction rate for the air blower 220 is determined may be different from each other with respect to "B" and "C".

Thereafter, the controller 30 may obtain a voltage "V" supplied to the heating wire 210 or the air blower 220 (420). In the instant case, the controller 30 may obtain the voltage through a vehicle network.

Thereafter, the controller 30 may adjust the voltage "V" supplied to the heating wire 210 or the air blower 220 based on a result of multiplying the obtained voltage "V" by the voltage reduction rate. For example, when the supply voltage is 5 V and the voltage reduction rate is 10%, the controller 30 may change the supply voltage to 4.5 V. In this regard, it will be described in more detail with reference to [Table 2] below.

TABLE 2

| Example | Reference position | Variable position |
|---|---|---|
| Seat angle | $\theta = 0$ | $\theta = 15°$ |
| Heating level | 3 level | 3 level |
| Contact area | A (initial area, m$^2$) | A × Log(B × $\theta$ + C) |
| Supply voltage | V (Voltage) | V/Log(B × $\theta$ + C) |
| Actual temperature | T (Kelvin temperature) | T/(A × Log(B × $\theta$ + C)) |
| Sensory temperature | T (Kelvin temperature) | T |

Table 2 shows the result of reducing the voltage supplied to the heating wire 210 when the seat angle is changed by 15° backward from a reference position ($\theta=0$). It may be seen that there is no change in a heating level, and the contact area between the seat and the occupant has changed as the seat angle is changed. Accordingly, the controller 30 has adjusted the supply voltage, and as a result, an actual temperature was also adjusted. However, it may be seen that the sensory temperature of the occupant remains the same.

As a result, the controller 30 may step down the voltage supplied to the heating wire 210 while maintaining the sensory temperature of the occupant within a tolerance range, reducing the amount of power consumption in a battery 300. This means improvement in fuel efficiency of a vehicle (especially an electric vehicle). [Table 3] below shows a fuel increase rate measured when various exemplary embodiments of the present invention are applied to an actual vehicle.

TABLE 3

| Vehicle model | Power consumption | Voltage reduction rate |
|---|---|---|
| A1 | 128 W | 2.8% |
| A2 | 309 W | 3.5% |
| Increase rate of fuel efficiency of about 1.2%~2.8% | | |

Meanwhile, as another exemplary embodiment of the present invention, the controller 30 may adjust the voltage supplied to the heating wire 210 or the air blower 220 provided in the vehicle seat 200 based on the table in [Table 1].

The controller 30 may determine a voltage reduction rate based on the table in [Table 1] after obtaining the body information related to the occupant (passenger), and apply the determined voltage reduction rate to the voltage supplied to the heating wire 210 or the air blower 220 in consideration of the operation time of the heating wire 210 or the air blower 220. That is, the controller 30 may adjust the voltage supplied to the heating wire 210 or the air blower 220 based on the determined voltage reduction rate. In the instant case, the number of times the voltage reduction rate is applied may be limited according to the intention of a designer.

In another exemplary embodiment of the present invention, the controller 30 may adjust the voltage supplied to the heating wire 210 or the air blower 220 provided in the vehicle seat 200 based on the position of the vehicle seat 200 and the body information related to the occupant of the vehicle seat 200 and the power consumption time of the vehicle seat 200.

That is, the controller 30 may primarily apply the voltage reduction rate obtained based on [Table 1] to the voltage supplied to the heating wire 210 or the air blower 220, and secondarily apply the voltage reduction rate obtained based on a position of the vehicle seat 200 to a result of the primarily applying.

Figure 5:
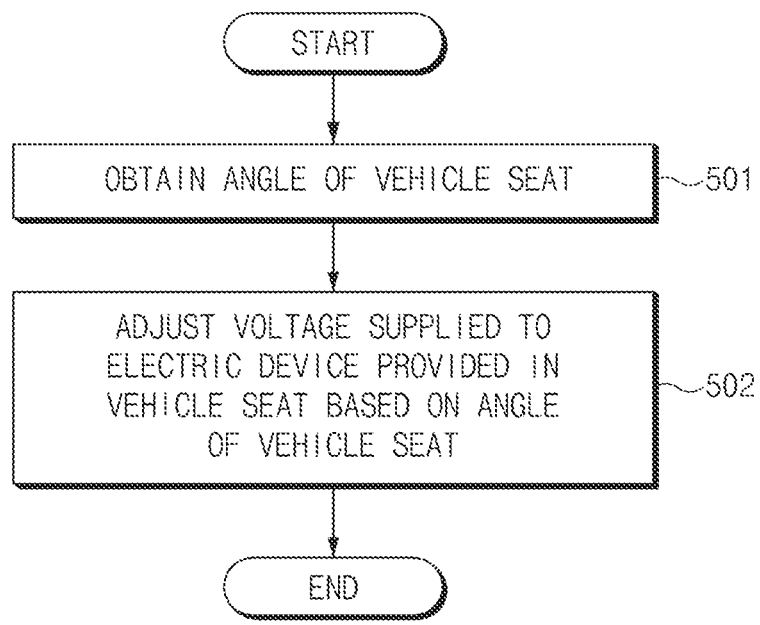
FIG. 5 is a flowchart of a method for controlling power consumption in a vehicle seat according to various exemplary embodiments of the present invention.

FIG. 5 is a flowchart of a method for controlling power consumption in a vehicle seat according to various exemplary embodiments of the present invention.

First, the sensor 20 may obtain an angle of the vehicle seat 200 (501).

Thereafter, the controller 30 may adjust a voltage supplied to the electric device (the heating wire 210 or the air blower 220) provided in the vehicle seat 200 based on an angle of the vehicle seat 200 (502). In the instant case, the controller 30 may determine a voltage reduction rate using a correction constant according to the angle of the vehicle seat 200 and a thickness of the vehicle seat 200 and a correction constant according to a material of the vehicle seat 200, and adjust the voltage supplied to the electric device according to the determined voltage reduction rate.

Figure 6:
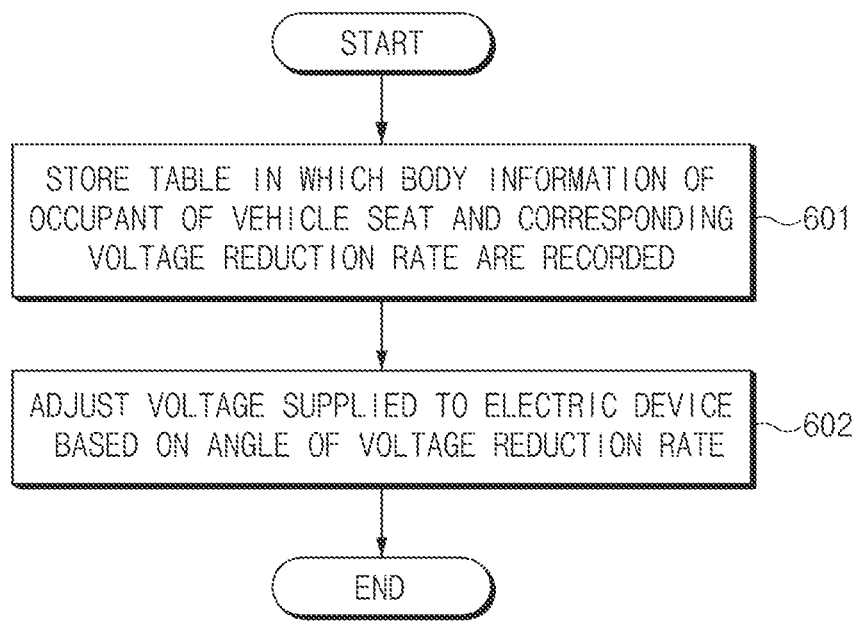
FIG. 6 is a flowchart of a method for controlling power consumption in a vehicle seat according to various exemplary embodiments of the present invention.

FIG. 6 is a flowchart of a method for controlling power consumption in a vehicle seat according to various exemplary embodiments of the present invention.

First, the storage 10 may store a table in which body information related to an occupant of the vehicle seat 200 and a corresponding voltage reduction rate are recorded (601).

Thereafter, the controller 30 may adjust a voltage supplied to the electric device (the heating wire 210 or the air blower 220) based on the voltage reduction rate (602). In the instant case, the controller 30 may adjust the number of times the voltage reduction rate is applied to the voltage supplied to the electric device in consideration of the operation time of the electric device. Furthermore, the controller 30 may primarily apply the voltage reduction rate obtained according to the table to the voltage supplied to the electric device, and secondarily apply the voltage reduction rate determined based on the angle of the vehicle seat to a result of the primarily applying.

Figure 7:
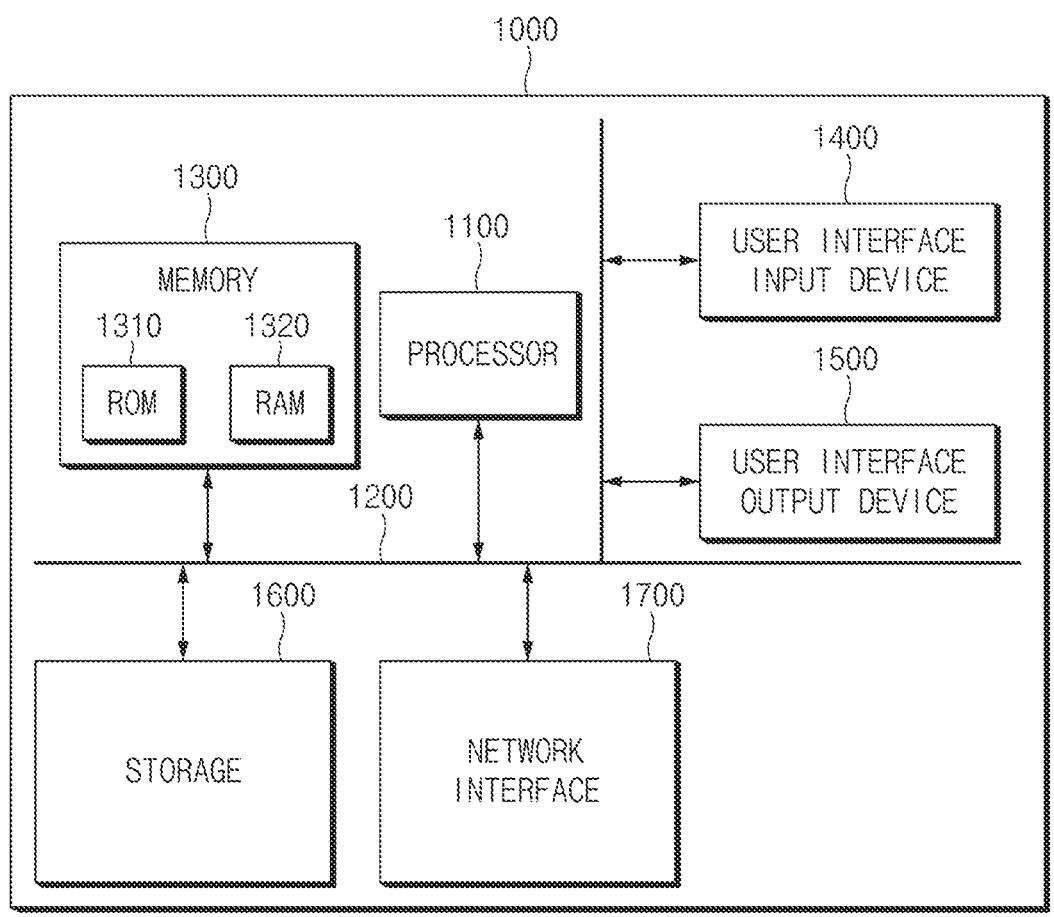
FIG. 7 is a block diagram illustrating a computing system for performing a method for controlling power consumption in a vehicle according to various exemplary embodiments of the present invention.

FIG. 7 is a block diagram illustrating a computing system for performing a method for controlling power consumption in a vehicle according to various exemplary embodiments of the present invention.

Referring to FIG. 7, the method for controlling the method for controlling power consumption in a vehicle seat according to various exemplary embodiments of the present invention as described above may be also implemented through a computing system. A computing system 1000 may include at least one processor 1100, a memory 1300, a user interface input device 1400, a user interface output device 1500, storage 1600, and a network interface 1700, which are connected to each other via a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a solid state drive (SSD) a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The above description is merely illustrative of the technical idea of the present invention, and various modifications and variations may be made without departing from the essential characteristics of the present invention by those skilled in the art to which various exemplary embodiments of the present invention pertains.

Therefore, the exemplary embodiments of the present invention are provided to explain the spirit and scope of the present invention, but not to limit them, so that the spirit and scope of the present invention is not limited by the embodiments. The scope of protection of the present invention may be interpreted by the following claims, and all technical ideas within the scope equivalent thereto may be construed as being included in the scope of the present invention.

According to the vehicle seat power consumption control device and the method therefore according to various exemplary embodiments of the present invention, it is possible to reduce power consumption of a battery while maintaining a sensory temperature of an occupant at a certain level by reducing a voltage supplied to a heating wire or air blower provided in a vehicle seat, based on body information related to an occupant of a vehicle seat and power consumption time (operation time of a heating wire or an air blower) of a vehicle seat, improving fuel efficiency of the vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle seat power consumption control device comprising:
   a sensor configured to obtain a seat angle of a vehicle seat; and
   a controller connected to the sensor and configured to adjust a voltage supplied to an electric device provided in the vehicle seat, according to the seat angle,
   wherein the controller is configured to determine a voltage reduction rate using a correction constant according to the seat angle and a thickness of the vehicle seat, and a correction constant according to a material of the vehicle seat.

2. The vehicle seat power consumption control device of claim 1, wherein the voltage reduction rate is determined by an equation of:

$$K_c = \frac{1}{\mathrm{Log}(B \times \theta + C)}$$

wherein Kc denotes the voltage reduction rate, B denotes the correction constant according to the thickness of the vehicle seat, θ denotes the seat angle, and C denotes the correction constant according to the material of the vehicle seat.

3. The vehicle seat power consumption control device of claim 1, wherein the controller is configured to adjust the voltage supplied to the electric device according to the determined voltage reduction rate.

4. The vehicle seat power consumption control device of claim 1, wherein the seat angle is one of a back angle of the vehicle seat, a cushion angle of the vehicle seat, and an average value of the back angle of the vehicle seat and the cushion angle of the vehicle seat.

5. A vehicle seat power consumption control method comprising:
obtaining, by a sensor, a seat angle of a vehicle seat; and
adjusting, by a controller connected to the sensor, a voltage supplied to an electric device provided in the vehicle seat according to the seat angle,
wherein the adjusting of the voltage supplied to the electric device includes:
determining a voltage reduction rate using a correction constant according to the seat angle and a thickness of the vehicle seat, and a correction constant according to a material of the vehicle seat; and
adjusting the voltage supplied to the electric device according to the determined voltage reduction rate.

6. The vehicle seat power consumption control method of claim 5, wherein the seat angle is one of a back angle of the vehicle seat, a cushion angle of the vehicle seat, and an average value of the back angle of the vehicle seat and the cushion angle of the vehicle seat.

7. A vehicle seat power consumption control device comprising:
a storage configured to store a table in which body information related to an occupant of a vehicle seat and a voltage reduction rate corresponding to the body information are recoded; and
a controller connected to the storage and configured to adjust a voltage supplied to an electric device according to the voltage reduction rate.

8. The vehicle seat power consumption control device of claim 7, wherein the controller is configured to adjust a number of times the voltage reduction rate is applied to the voltage supplied to the electric device in consideration of an operation time of the electric device.

9. The vehicle seat power consumption control device of claim 7, further including:
a sensor configured to obtain a seat angle of the vehicle seat; and
wherein the controller is configured to primarily apply the voltage reduction rate obtained according to the table to the voltage supplied to the electric device, and secondarily apply a voltage reduction rate determined according to the seat angle to a result of the primarily applying.

10. The vehicle seat power consumption control device of claim 9, wherein the controller is configured to determine the secondarily applied voltage reduction rate using a correction constant according to the seat angle and a thickness of the vehicle seat, and a correction constant according to a material of the vehicle seat.

11. The vehicle seat power consumption control device of claim 10, wherein the secondarily applied voltage reduction rate is determined by an equation of:

$$K_c = \frac{1}{\mathrm{Log}(B \times \theta + C)}$$

wherein Kc denotes the secondarily applied voltage reduction rate, B denotes the correction constant according to the thickness of the vehicle seat, θ denotes the seat angle, and C denotes the correction constant according to the material of the vehicle seat.

12. The vehicle seat power consumption control device of claim 9, wherein the seat angle is one of a back angle of the vehicle seat, a cushion angle of the vehicle seat, and an average value of the back angle of the vehicle seat and the cushion angle of the vehicle seat.

13. A vehicle seat power consumption control method comprising:
storing, by a storage, a table in which body information related to an occupant of a vehicle seat and a voltage reduction rate corresponding to the body information are recoded; and
adjusting, by a controller connected to the storage, a voltage supplied to an electric device based on the voltage reduction rate.

14. The vehicle seat power consumption control method of claim 13, wherein the adjusting of the voltage supplied to the electric device includes adjusting, by the controller, a number of times the voltage reduction rate is applied to the voltage supplied to the electric device in consideration of an operation time of the electric device.

15. The vehicle seat power consumption control method of claim 13, wherein the adjusting of the voltage supplied to the electric device includes:
primarily applying the voltage reduction rate obtained according to the table to the voltage supplied to the electric device, and
secondarily applying a voltage reduction rate determined according to a seat angle of the vehicle seat to a result of the primarily applying.

16. The vehicle seat power consumption control method of claim 15,
wherein the secondarily applying of the voltage reduction rate includes determining the secondarily applied voltage reduction rate using a correction constant according to the seat angle and a thickness of the vehicle seat, and a correction constant according to a material of the vehicle seat.

17. The vehicle seat power consumption control method of claim 16, wherein the secondarily applied voltage reduction rate is determined by an equation of:

$$K_c = \frac{1}{\mathrm{Log}(B \times \theta + C)}$$

wherein Kc denotes the secondarily applied voltage reduction rate, B denotes the correction constant according to the thickness of the vehicle seat, θ denotes the seat angle, and C denotes the correction constant according to the material of the vehicle seat.

18. The vehicle seat power consumption control method of claim 15, wherein the seat angle is one of a back angle of the vehicle seat, a cushion angle of the vehicle seat, and an average value of the back angle of the vehicle seat and the cushion angle of the vehicle seat.

* * * * *